United States Patent
Chiba et al.

(10) Patent No.: US 8,953,423 B2
(45) Date of Patent: Feb. 10, 2015

(54) DISC CARTRIDGE AND CHANGER

(71) Applicant: Sony Corporation, Tokyo (JP)

(72) Inventors: Yoshihisa Chiba, Miyagi (JP); Hisao Tanaka, Tokyo (JP); Osami Banjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/077,264

(22) Filed: Nov. 12, 2013

(65) Prior Publication Data

US 2014/0143796 A1 May 22, 2014

(30) Foreign Application Priority Data

Nov. 19, 2012 (JP) ................. 2012-253470

(51) Int. Cl.
*G11B 27/11* (2006.01)
*G11B 23/03* (2006.01)
*G11B 23/28* (2006.01)

(52) U.S. Cl.
CPC ........ *G11B 23/0305* (2013.01); *G11B 23/0323* (2013.01); *G11B 23/283* (2013.01)
USPC ..... 369/30.3; 369/47.55; 369/52.1; 369/53.2; 720/725

(58) Field of Classification Search
None
See application file for complete search history.

(56) References Cited

U.S. PATENT DOCUMENTS

2005/0270964 A1* 12/2005 Ujino ............................ 369/274
2007/0127323 A1* 6/2007 Owens ....................... 369/30.38

FOREIGN PATENT DOCUMENTS

JP 4042961 B2 2/2008

* cited by examiner

*Primary Examiner* — Wayne Young
*Assistant Examiner* — Brian Butcher
(74) *Attorney, Agent, or Firm* — Sony Corporation

(57) ABSTRACT

There is provided a cartridge including a plurality of optical information recording media having unique information recorded thereon, an accommodation body configured to accommodate the plurality of optical information recording media, and an identification device configured to store the unique information of the plurality of optical information recording media and supply the unique information to a changer in a non-contact manner, the identification device being provided in the accommodation body.

14 Claims, 12 Drawing Sheets

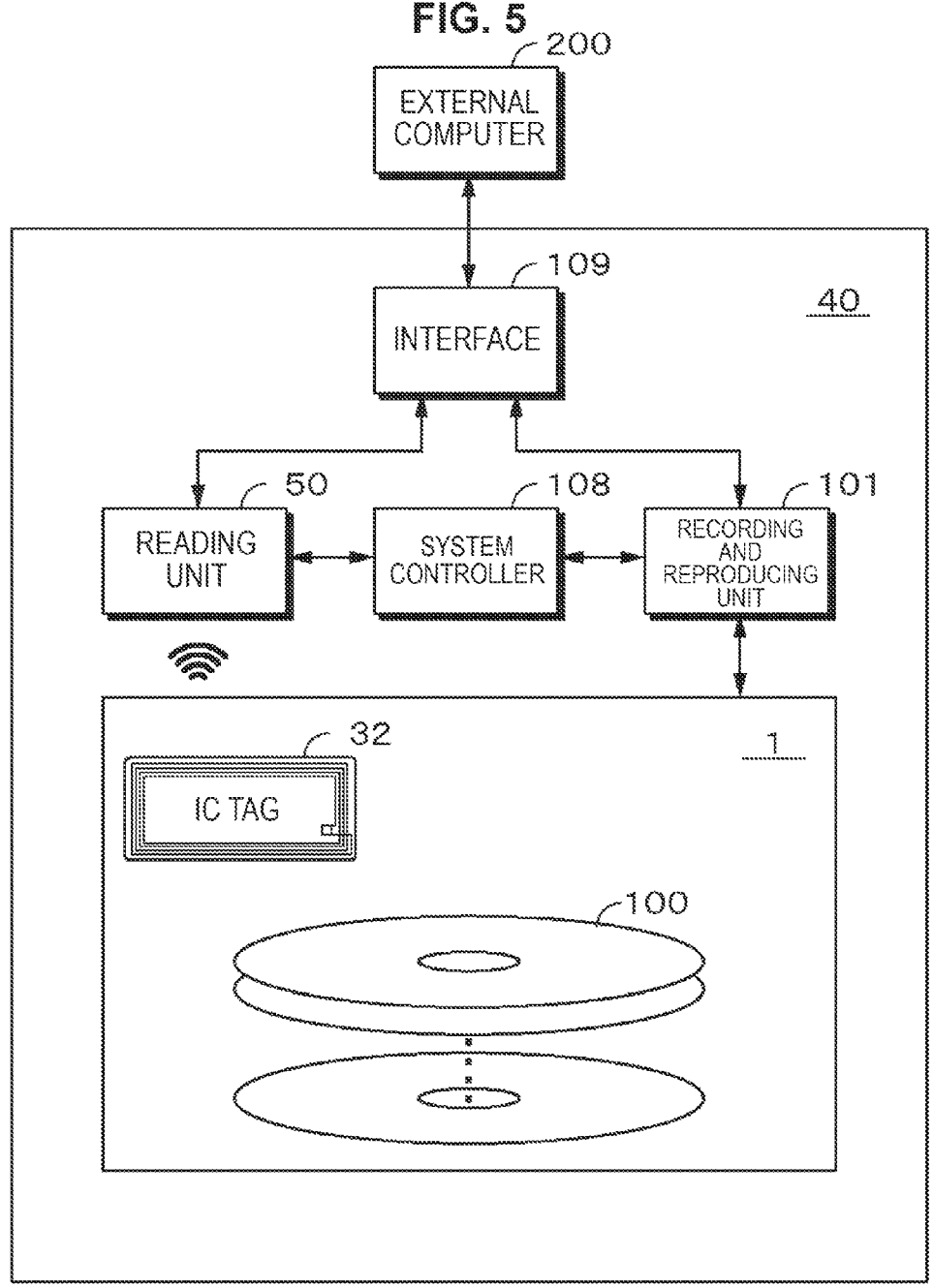
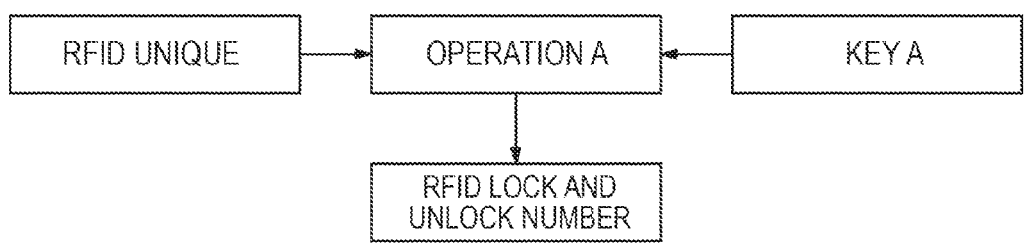

DISC CARTRIDGE AND CHANGER

CROSS REFERENCE TO RELATED APPLICATIONS

This application claims the benefit of Japanese Priority Patent Application JP 2012-253470 filed Nov. 19, 2012, the entire contents of which are incorporated herein by reference.

BACKGROUND

The present disclosure relates to a disc cartridge and a changer. More specifically, the present disclosure relates to a disc cartridge in which a plurality of optical information recording media are accommodated, and a changer.

Backup for protecting the information is performed to cope with a loss of information such as videos stored in a computer. A magnetic tape is widely used as a medium for backup. A magnetic tape drive of a fifth generation standard LTO-5 of LTO (Linear Tape-Open), for example, is connected to a server for a backup target and information of the backup target is stored in the magnetic tape.

The backup target is often important information. It is often necessary for the backup target to be stored for a long period of time. Therefore, it is necessary for a medium exemplified as the magnetic tape used for backup to have normality and durability. Further, it is necessary for confidentiality, integrity and availability to be maintained in information to be backed up. Also, it is particularly necessary for integrity, namely, a state in which information is not destroyed, tampered or erased to be secured for the medium used for backup.

A recording medium cartridge which enables authenticity of recorded data to be simply verified and a recording and reproducing apparatus therefor are disclosed in Japanese Patent No. 4042961. In Japanese Patent No. 4042961, a CRC (Cyclic Redundancy Check) code of data recorded in a magnetic tape is recorded in a cartridge memory of the magnetic tape cartridge in a state in which it is difficult for the code to be rewritten. Also, at the time of reproduction, the recording and reproducing apparatus compares a CRC code from the magnetic tape with the CRC code from the cartridge memory and verifies the authenticity of the data based on a comparison result.

SUMMARY

In Japanese Patent No. 4042961, the magnetic tape is used as the medium for backup. Since the magnetic tape is based on a sequential access scheme in which information is read or written sequentially from the beginning, the magnetic tape has a characteristic in that it takes time to read only a necessary part. Further, since the magnetic tape is based on a scheme in which reading and writing are performed through contact between the tape and a head, the tape is likely to be damaged at the time of recording and reproducing the information and at the time of attaching or detaching the tape to or from the recording and reproducing apparatus. Also, as the number of times of information recording or reproducing or the number of times of attaching or detaching of the tape to or from the recording and reproducing apparatus increases, the lifetime of the magnetic tape is shortened.

On the other hand, capacities of optical information recording media are gradually increasing. Also, a disc cartridge in which a plurality of large-capacity optical information recording media are accommodated is known. The disc cartridge may be an alternative medium to the magnetic tape. The optical information recording medium used for the disc cartridge is capable of being randomly accessed. Further, since the optical information recording medium is based on a scheme in which reading or writing is performed without contact between the medium and a head, a possibility of damaging the medium is reduced. Therefore, the disc cartridge can solve the problems of the magnetic tape described above. Further, in the optical information recording medium, effects that reduction of information and time due to omission of reading or writing of overlapping information can be expected.

However, the disc cartridge accommodating optical information recording media originally has a structure in which simple separation is difficult, but separation itself can be made. Also, if a state of a combination of a separated case or optical information recording media becomes different from the time of manufacturing, the disc may be improper.

Therefore, it is desirable to provide a cartridge and a changer which enable normality of optical information recording media and the cartridge accommodating the optical information recording media to be confirmed.

According to an embodiment of the present disclosure, there is provided a cartridge including a plurality of optical information recording media having unique information recorded thereon, an accommodation body configured to accommodate the plurality of optical information recording media, and an identification device configured to store the unique information of the plurality of optical information recording media and supply the unique information to a changer in a non-contact manner, the identification device being provided in the accommodation body.

According to an embodiment of the present disclosure, there is provided a changer including a cartridge accommodation unit configured to accommodate a cartridge including a plurality of optical information recording media having unique information recorded thereon, an accommodation body which accommodates the plurality of optical information recording media, and an identification device which stores the unique information of the plurality of optical information recording media and supplies the unique information to the changer in a non-contact manner, the identification device being provided in the accommodation body, an optical unit configured to perform recording or reproducing of the optical information recording medium, a reading unit configured to read information of the identification device of the cartridge in a non-contact manner, and a control unit configured to compare the unique information read from the optical information recording medium with the unique information read from the identification device.

According to this disclosure, it is possible to confirm validity of a combination of an optical information recording medium and an identification device by comparing unique information of the optical information recording medium with unique information of the identification device. Therefore, it is possible to detect replacement of the optical information recording medium (or exchange of an accommodation body) by a user. Therefore, in this disclosure, it is possible to provide a cartridge and a changer in which normality of optical information recording media can be confirmed and the cartridge in which a plurality of optical information recording media are accommodated.

BRIEF DESCRIPTION OF THE DRAWINGS

FIG. 5 is a block diagram illustrating an example of an internal configuration of the recording and reproducing apparatus according to an embodiment of the present disclosure;

FIG. 6 is a schematic diagram illustrating an example of a method of generating an RFID lock and unlock number of a disc cartridge according to an embodiment of the present disclosure;

DETAILED DESCRIPTION OF THE EMBODIMENT(S)

Embodiments which will be described below are suitable specific examples of this disclosure, and various technically desirable limitations are made. However, the scope of this disclosure is not limited to these embodiments, particularly, unless it is specifically described that something is limiting to this disclosure.

Further, the description of this disclosure is given in the following order.

<An embodiment of this disclosure>
[1. Configuration of disc cartridge]
[2. Configuration of recording and reproducing apparatus]
[3. Internal configuration of recording and reproducing apparatus]
[4. Configuration of recording and reproducing unit]
[5. Configuration of identification device]
[6. Method of storing identification information]
[7. Method of operating recording and reproducing apparatus]
[8. Configuration of external computer to which recording and reproducing apparatus is attached]

<Variant>
<An Embodiment of this Disclosure>
[1. Configuration of Disc Cartridge]

Figure 1:
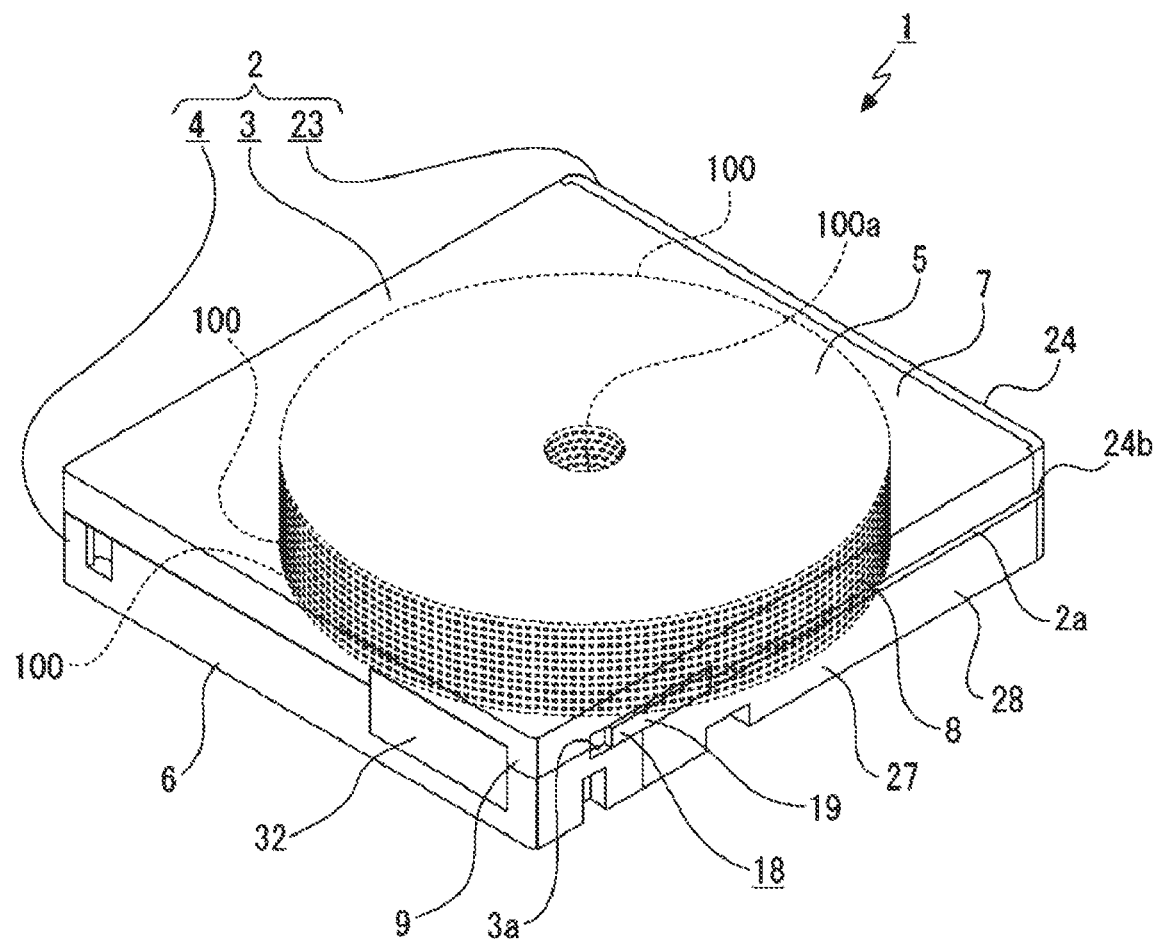
FIG. 1 is a perspective view illustrating an example of a disc cartridge according to an embodiment of the present disclosure.
Figure 2:
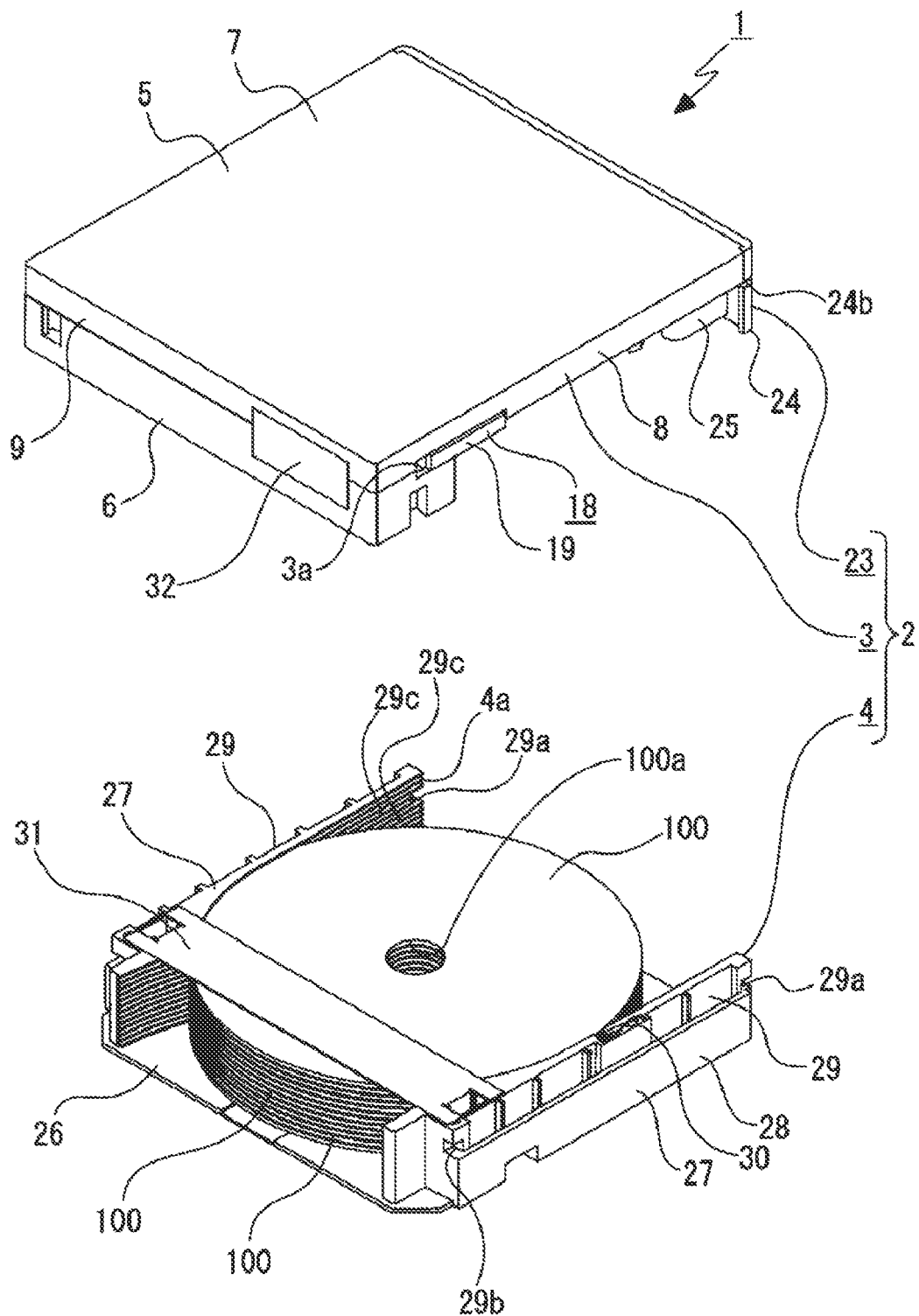
FIG. 2 is a perspective view illustrating an example of a state in which a disc cartridge is separated according to an embodiment of the present disclosure.
Figure 3:
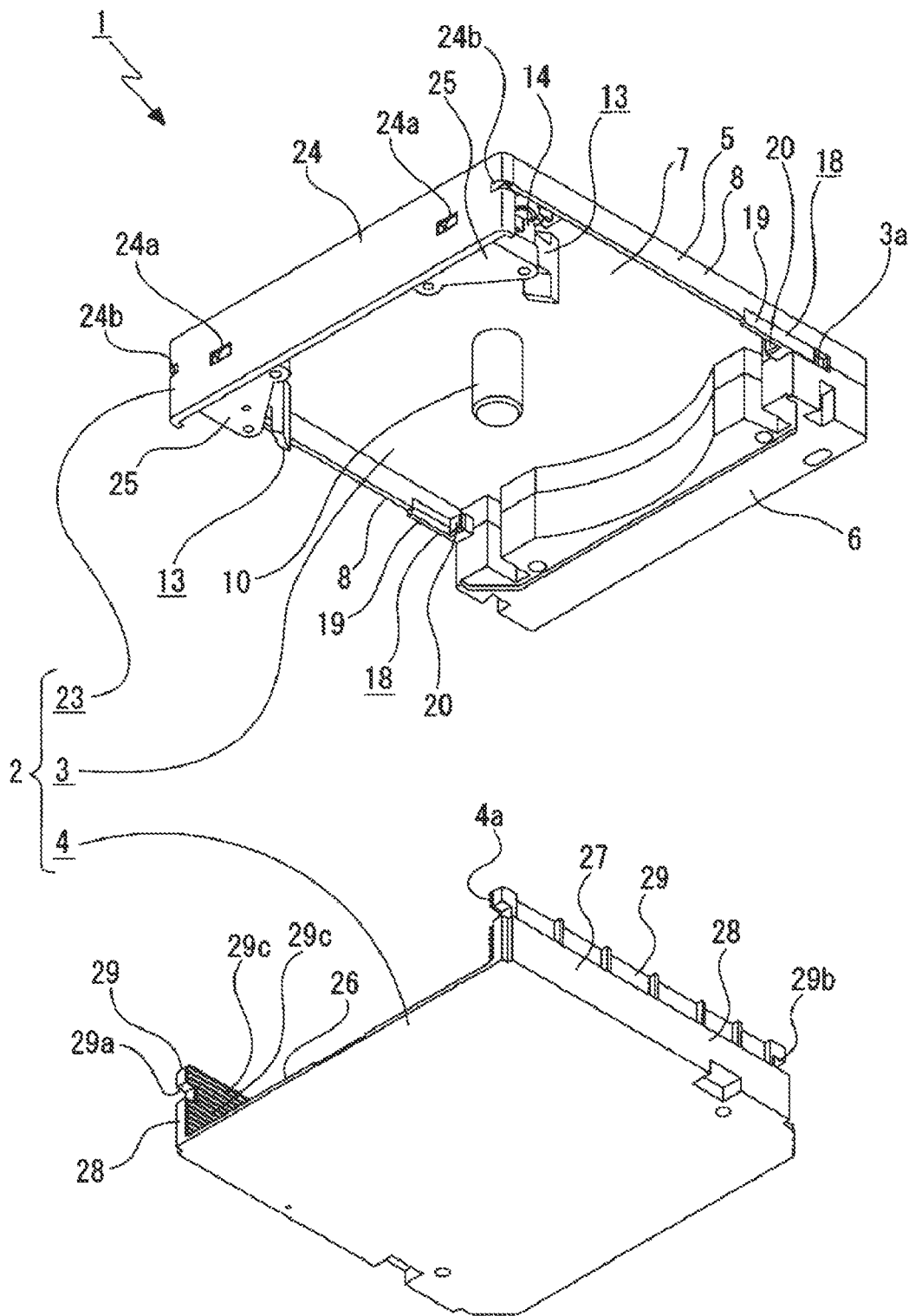
FIG. 3 is a perspective view illustrating an example of a state in which a disc cartridge is separated, when viewed from a different direction, according to an embodiment of the present disclosure.

First, a configuration of a disc cartridge according to an embodiment of this disclosure will be described. FIG. 1 illustrates a disc cartridge 1 as an example of the cartridge. Further, FIGS. 2 and 3 illustrate an example of a state in which the disc cartridge 1 is separated. Further, in the following description, front, rear, up, down, left and right directions are indicated by defining a direction in which the disc cartridge 1 is inserted from a cartridge insertion/ejection opening of a recording and reproducing apparatus as a changer as a front for convenience.

In the disc cartridge 1, respective necessary portions are arranged inside a case body 2 as an accommodation body. The case body 2 includes a first shell 3 and a second shell 4. For example, disc-shaped optical information recording media 100, 100 . . . can be accommodated at equal intervals in a vertical direction inside the case body 2. For example, a BD (Blu-ray Disc) may be used or a DVD (Digital Versatile Disc) may be used for the optical information recording medium 100. A medium having a form other than a disc may be used for the optical information recording medium 100.

For example, an upper shell of the first shell 3 and, for example, a lower shell of the second shell 4 can be coupled or separated in a vertical direction (see FIGS. 2 and 3). Further, the first shell 3 and the second shell 4 may have a form in which the first shell 3 and the second shell 4 are coupled or separated in a different direction, e.g., a horizontal direction.

The first shell 3 is formed of a resin material, and includes a base body 5 and a subsidiary base 6 attached to a rear end portion of the base body 5, which are coupled in a vertical direction (see FIGS. 2 and 3).

The base body 5 includes a vertically directed base face portion 7, side face portions 8 and 8 respectively projected downward from both left and right end portions of the base face portion 7, and a rear face portion 9 projected downward from a rear end portion of the base face portion 7, as illustrated in FIG. 2.

A round shaft-shaped center pin 10 projected downward is provided in a central portion of the base face portion 7 (see FIG. 3).

Support shafts projected downward, not illustrated, are provided to be spaced from side to side in positions near a front end of the base face portion 7. Spring hook projections, not illustrated, are provided in positions near the support shafts, which are not illustrated, in the lower surface of the base face portion 7.

Lock levers 13 and 13 are supported by the support shafts, which are not illustrated, of the first shell 3 to be rotatable around respective center axes of the support shafts, which are not illustrated. The lock lever 13 includes a cylindrical supported portion 14 supported through insertion of the support shaft, which is not illustrated, lock portions, not illustrated, projected from an approximate first half portion of the supported portion 14 to an approximate front side and also projected to a side, and an unlocking portion, not illustrated, projected from an approximate lower half portion of the supported portion 14 to an oblique front side. In the lock levers 13 and 13, the lock portions, which are not illustrated, are urged in directions approaching the side face portions 8 and 8 by urging springs which are not illustrated, respectively.

Slider support portions 3a and 3a are formed in positions near a rear end in both left and right side face portions of the first shell 3, respectively.

The lock sliders 18 and 18 are supported to be slidable in a back-and-forth direction by the slider support portions 3a and 3a of the first shell 3, respectively. The lock slider 18 includes a supported portion 19 extending back and forth, a lock portion 20 projected inwardly from a portion other than a front end portion of the supported portion 19, and a spring support shaft portion, not illustrated, projected from a rear face of the lock portion 20 to a rear side. In the lock sliders 18 and 18, the supported portions 19 and 19 are supported to be slidable by the slider support portions 3a and 3a of the first shell 3, respectively, and coil springs, not illustrated, are supported by the spring support shaft portions, which are not illustrated. Both ends of the coil spring, which is not illustrated, come in contact with a rear surface of the lock portion 20 and a rear surface forming the slider support portion 3a, respectively. Therefore, the lock slider 18 is urged forward by the coil spring, which is not illustrated.

An opening and closing panel 23 is attached to a front end portion of the first shell 3. The opening and closing panel 23 includes a panel portion 24 formed in a rectangular plate shape which is long from side to side and directed in a back-and-forth direction, and attached projections 25 and 25 projected from a lower end portion to a rear side in a rear surface of the panel portion 24, as illustrated in FIG. 2.

Insertion apertures 24a and 24a are formed in the panel portion 24 to be spaced from side to side (see FIG. 3). Insertion notches 24b and 24b opened outward are formed in both left and right end portions of the panel portion 24, respectively. The attached projections 25 and 25 are provided to be spaced from side to side.

Front end portions of the attached projections 25 and 25 are screwed to the lower surfaces of the support shafts, which are not illustrated, provided in the base face portion 7, respectively, such that the opening and closing panel 23 is attached to the first shell 3. In a state in which the opening and closing panel 23 is attached to the first shell 3, the attached projections 25 and 25 are screwed below the support shafts, which are not illustrated, respectively, and dropout of the lock levers 13 and 13 supported by the support shafts, which are not illustrated, and the urging springs, which are not illustrated, from the support shafts, which are not illustrated, is prevented.

In a state in which the opening and closing panel 23 is attached to the first shell 3, unlocking portions, which are not illustrated, of the lock levers 13 and 13 are located immediately behind the insertion holes 24a and 24a, respectively.

The second shell 4 is formed of a resin material, and includes a base face portion 26 directed in a vertical direction, and side face portions 27 and 27 respectively projected upward from both left and right end portions of the base face portion 26, which are formed integrally (see FIG. 2).

The side face portion 27 includes an outer side wall portion 28, and an inner side wall portion 29 located on an inner side of the outer side wall portion 28. A height of the outer side wall portion 28 is substantially half of a height of the inner side wall portion 29, and an upper surface of the outer side wall portion 28 is lower from an upper surface of the inner side wall portion 29.

A first lock recess portion 29a that opens forward and penetrates from side to side is formed in a front end portion of the inner side wall portion 29. A second lock recess portion 29b that opens backward and outward is formed in a position near a rear end of the inner side wall portion 29.

Holding grooves 29c, 29c . . . are formed on an inner surface of the inner side wall portion 29, and the holding grooves 29c, 29c . . . are located to be spaced at equal intervals in a vertical direction.

A spring attachment recess portion which is not illustrated is formed in one of the inner side wall portions 29. The spring attachment recess portion, which is not illustrated, opens upward and inward.

A presser bar spring 30 is inserted into the spring attachment recess portion, which is not illustrated, and attached (see FIG. 2). The presser bar spring 30 includes a plate-shaped attached portion which is vertically long, and spring portions projected from a rear edge of the attached portion, which are integrally formed of a metal material. The spring portions are provided to be spaced at equal intervals in a vertical direction at the same interval as the vertical interval between the holding grooves 29c, 29c . . . and are provided in the same number as the holding grooves 29c, 29c . . . .

The presser bar spring 30 is inserted into the spring attachment recess portion, which is not illustrated, and a front end portion of the spring portion is projected on an inner side of the inner side wall portion 29.

A bridge member 31 is attached in a position near a rear end between the side face portions 27 and 27 of the second shell 4 (see FIG. 2). The bridge member 31 is formed by bending a plate-shaped metal material in a predetermined shape. As the bridge member 31 is attached between the side face portions 27 and 27, intensity of the second shell 4 as a whole can be secured.

In the disc cartridge 1, an RFID tag 32, for example, is affixed as an identification device having identification information to, for example, a rear face of the case body 2. The RFID tag 32 may be attached to any place of the disc cartridge 1 as long as the RFID tag 32 can be read from a device which reads the identification information of the RFID tag 32. The RFID tag 32 can store information electronically. Here, the RFID tag 32 includes an integrated circuit (IC) which is not illustrated, and a coiled antenna, not illustrated herein, which is connected to the integrated circuit and can transmit or receive electromagnetic waves. Predetermined information, e.g., information on the disc cartridge 1 or the optical information recording media 100, 100 . . . , is input to the RFID tag 32. Details of the RFID tag 32 will be described below.

In the disc cartridge 1 configured as above, the optical information recording media 100, 100 . . . are held inside the case body 2 (see FIGS. 1 and 2). The optical information recording medium 100 is held inside the case body 2 as its outer peripheral portion is inserted into the holding grooves 29c and 29c formed in the side face portions 27 and 27 of the second shell 4 from the front side in a state in which the first shell 3 and the second shell 4 are separated. Therefore, an opening located in a front end of the second shell 4 is formed as the disc insertion/ejection opening 4a through which insertion and removal of the optical information recording media 100, 100 . . . into or from the second shell 4 is performed.

In a state in which the first shell 3 and the second shell 4 have been coupled and the opening and closing panel 23 is attached to the first shell 3 to constitute the case body 2, insertion grooves 2a and 2a extending back and forth are formed between a lower surface of the side face portions 8 and 8 in the first shell 3 and an upper surface of the outer side wall portions 28 and 28 in the second shell 4, respectively (see FIG. 1). In the insertion grooves 2a and 2a, rear ends are continuous to the slider support portions 3a and 3a of the first shell 3, respectively, and front ends are continuous to the insertion notches 24b and 24b formed in the panel portion 24 of the opening and closing panel 23, respectively.

The first shell 3 and the second shell 4 are coupled in a state in which the base face portion 7 of the base body 5 and the base face portion 26 face vertically.

The first shell 3 and the second shell 4 are locked by the lock levers 13 and 13 and the lock sliders 18 and 18 in a state in which the first shell 3 and the second shell 4 are coupled.

The lock levers 13 and 13 are located in a rotating end in a direction (outward) in which front end portions of the lock portions, which are not illustrated, are spaced from each other by an urging force of the urging springs, which are not illustrated. The lock portions, which are not illustrated, are inserted into and engaged with the first lock recess portions 29a and 29a formed in the side face portions 27 and 27 of the second shell 4, respectively.

The lock sliders 18 and 18 are located on a movable end on a front end by the urging force of the coil spring, which is not illustrated, and the lock portions 20 and 20 are inserted into and engaged with second lock recess portions 29b and 29b formed in the second side face portions 27 and 27 of the second shell 4, respectively.

As described above, in a state in which the first shell 3 and the second shell 4 are coupled and locked and the optical information recording media 100, 100 . . . are held inside the case body 2, the spring portion of the presser bar spring 30 contacts and presses a portion of the outer peripheral surface of each of the optical information recording media 100, 100 . . . , respectively. In this case, other portions in the outer peripheral surface of the optical information recording media 100, 100 . . . are pressed against a portion of the holding grooves 29c and 29c, and the optical information recording media 100, 100 . . . are positioned in a normal position inside the case body 2.

The center pin 10 provided in the first shell 3 is inserted into the central holes 100a, 100a . . . of the optical information recording media 100, 100 . . . in the state in which the first shell 3 and the second shell 4 are coupled.

[2. Configuration of Recording and Reproducing Apparatus]

Figure 4:
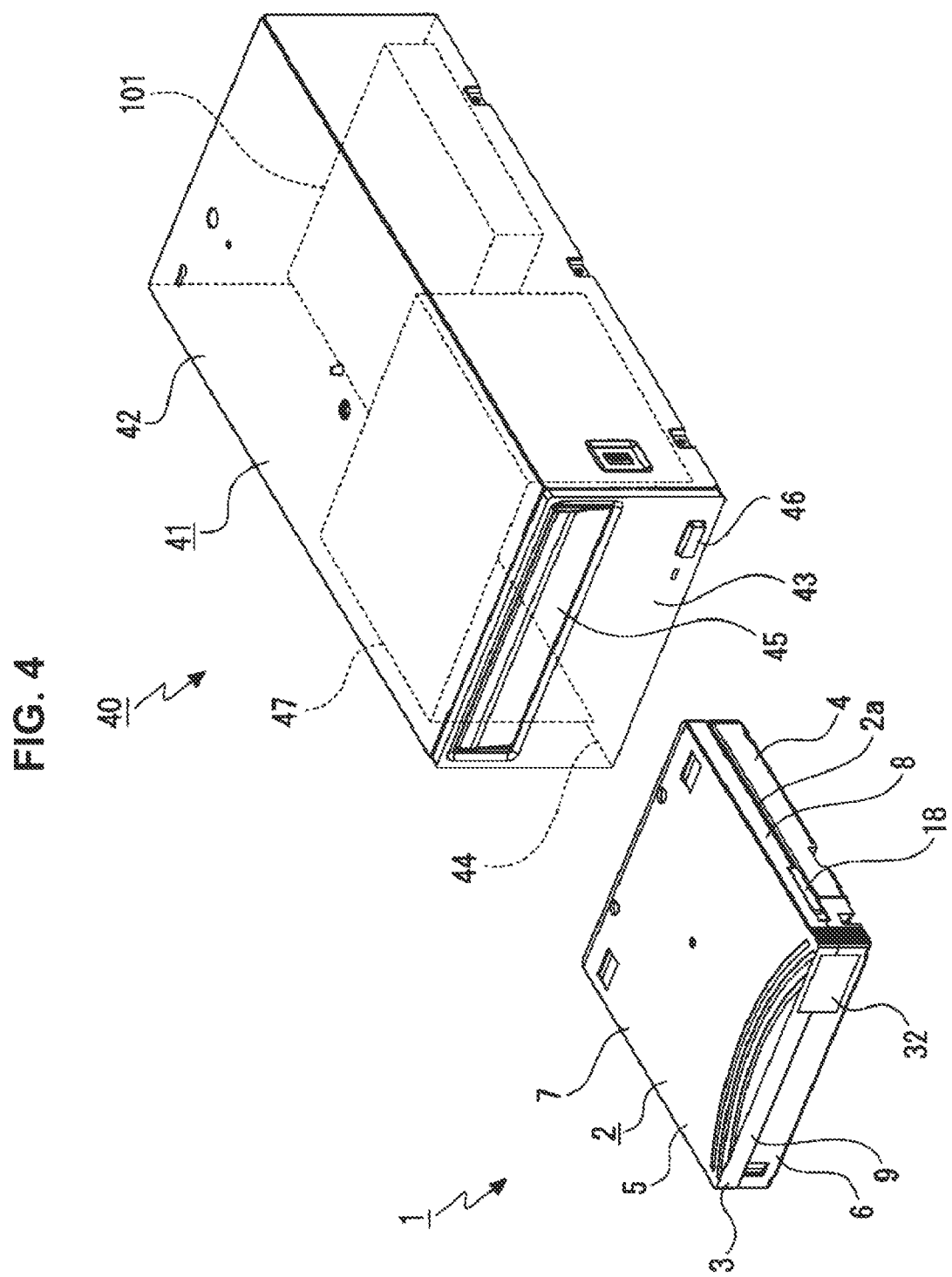
FIG. 4 is a perspective view illustrating an example of a disc cartridge and a recording and reproducing apparatus according to an embodiment of the present disclosure.

Next, a configuration of the recording and reproducing apparatus 40 will be described. FIG. 4 illustrates an example of the disc cartridge 1 and the recording and reproducing apparatus 40 as an example of the changer. In the recording and reproducing apparatus 40, all necessary portions are arranged inside an outer casing 41.

The outer casing 41 includes an outer frame 42 that opens backward and downward, a panel 43 attached to a rear end portion of the outer frame 42 and directed in a back-and-forth direction, and a base frame 44 attached to a lower end portion of the outer frame 42 and directed in a vertical direction, as illustrated in FIG. 4.

A cartridge insertion/ejection opening that penetrates back and forth is formed in an upper end portion of the panel 43 and can be opened or closed by a shutter 45. An eject button 46 is arranged in the lower end portion of the panel 43.

A disc holder 47 is arranged as a cartridge accommodation portion inside the outer casing 41. The disc holder 47 includes an upper holder and a lower holder. When the disc cartridge 1 is inserted into the recording and reproducing apparatus 40, the first shell 3 is held in the upper holder and the second shell 4 is held in the lower holder.

A recording and reproducing unit (drive) 101 is an optical unit (a pickup) which performs recording or reproducing of an information signal in the optical information recording media 100, 100 . . . and is arranged in a lower end portion on a front side inside the outer casing 41. A plurality of recording and reproducing units 101 may be provided.

If the disc cartridge 1 is inserted from the cartridge insertion/ejection opening of the panel 43, the disc cartridge 1 is inserted into the disc holder 47 from the rear side. When the disc cartridge 1 is inserted from the cartridge insertion/ejection opening of the panel 43, the shutter 45 is pressed and rotated.

If the disc cartridge 1 is inserted into the disc holder 47 from the rear side, a release piece of the upper holder, which is not illustrated, and a holding piece of the lower holder, which is not illustrated, are inserted into the insertion grooves 2a and 2a formed in the case body 2, respectively.

If the release pieces, which are not illustrated, are inserted into the insertion grooves 2a and 2a, respectively, and the disc cartridge 1 is moved to the inside of the disc holder 47, the supported portions 19 and 19 of the lock sliders 18 and 18 are pressed by the release pieces, which are not illustrated, respectively. When the supported portions 19 and 19 are pressed to the rear side by the release pieces, which are not illustrated, respectively, the lock sliders 18 and 18 are moved to the rear side against the urging force of the coil springs, which are not illustrated, respectively, and the lock portions 20 and 20 are drawn from the second lock recess portions 29b and 29b of the second shell 4, respectively. When the lock portions 20 and 20 are drawn from the second lock recess portions 29b and 29b, respectively, the lock of the first shell 3 and the second shell 4 by the lock sliders 18 and 18 is released.

In this case, unlocking pieces, not illustrated, provided in the disc holder 47 are inserted into the insertion holes 24a and 24a of the opening and closing panel 23, respectively. When the unlocking pieces, which are not illustrated, are inserted into the insertion holes 24a and 24a, respectively, the unlocking portions, which are not illustrated, of the lock levers 13 and 13 are pressed to the rear side by the unlocking pieces, which are not illustrated, respectively. When the unlocking portions, which are not illustrated, are pressed to the rear side by the unlocking pieces, which are not illustrated, the lock levers 13 and 13 are rotated against the urging force of the urging springs, which are not illustrated, respectively, and the lock portions, which are not illustrated, are drawn from the first lock recess portions 29a and 29a of the second shell 4, respectively. When the lock portions, which are not illustrated, are drawn from the first lock recess portions 29a and 29a, respectively, the lock of the first shell 3 and the second shell 4 by the lock levers 13 and 13 is released.

The release of the lock of the first shell 3 and the second shell 4 by the lock levers 13 and 13 is performed at the same time as the release of the lock of the first shell 3 and the second shell 4 by the lock sliders 18 and 18.

When the lock of the first shell 3 and the second shell 4 by the lock levers 13 and 13 and the lock sliders 18 and 18 is released, the first shell 3 and the second shell 4 enter a state in which the first shell 3 and the second shell 4 can be separated in a vertical direction.

In the state in which the first shell 3 and the second shell 4 can be separated, the second shell 4 is unified with the lower holder and moved downward without the first shell 3 being moved downward. Therefore, the first shell 3 and the second shell 4 are separated.

Then, an outer peripheral surface of the optical information recording medium 100 which is present at a height according to a stop position of the lower holder is pressed to the front side by an eject lever which is not illustrated, and the pressed optical information recording medium 100 is ejected from the second shell 4 to the recording and reproducing unit 101.

Also, the optical information recording medium 100 is loaded on the recording and reproducing unit 101, and recording or reproducing of information is performed.

[3. Internal Configuration of Recording and Reproducing Apparatus]

FIG. 5 illustrates an example of an internal configuration of the recording and reproducing apparatus 40. The disc cartridge 1 in which a plurality of optical information recording media 100 are accommodated and to which the RFID tag 32 is attached is mounted in the recording and reproducing apparatus 40.

The recording and reproducing apparatus 40 includes a reading unit 50, the recording and reproducing unit 101, a system controller 108, and an interface 109. The recording and reproducing apparatus 40 is connected to an external computer 200 via the interface 109.

The reading unit 50 has a function of exchanging the identification information with the RFID tag 32 through near field communication using an electromagnetic field or radio waves. A reader/writer, for example, is used for the reading unit 50. The reader/writer sends electromagnetic waves to the RFID tag 32. In the RFID tag 32, an integrated circuit is driven using power obtained through electromagnetic induction and communication with the reader/writer is performed. Thus, the RFID tag 32 transmits the identification information held in the RFID tag 32 in response to a request of the recording and reproducing apparatus 40. Further, a method based on contact rather than a method based on non-contact described above may be used for the exchange of the identification information between the reading unit 50 and the RFID tag 32.

The recording and reproducing unit 101 performs recording and reproducing of information in the optical information recording medium 100 taken out from the disc cartridge 1.

The system controller 108 as a control unit controls the respective units of the recording and reproducing apparatus 40, such as the reading unit 50 and the recording and reproducing unit 101. The system controller 108 includes a CPU (Central Processing Unit), a ROM (Read Only Memory), and a RAM (Random Access Memory), which are not illustrated. Further, the system controller 108 controls a recording medium exchange unit, which is not illustrated. The recording medium exchange unit takes out the predetermined optical information recording medium 100 from the plurality of optical information recording media accommodated in the disc cartridge 1 so that the recording and reproducing unit 101 can perform the recording and reproducing of information.

The interface 109 is connected to the recording and reproducing unit 101 and the external computer 200. A signal read from the optical information recording medium 100 by the recording and reproducing unit 101 is output to the external computer 200 via the interface 109. On the other hand, a signal to be recorded in the optical information recording medium 100 by the recording and reproducing unit 101 is input from the external computer 200 via the interface 109.

The interface 109 may be connected to the reading unit 50. In this case, control of the reading unit 50 may be performed by a manipulation input from the connected external computer 200.

The disc cartridge 1 can accommodate a plurality of, e.g., twelve, optical information recording media 100, as described above. Hereinafter, a configuration in which the disc cartridge 1 can accommodate twelve optical information recording media 100 will be illustrated and the identification information will be described.

Disc-0 to Disc-11 are accommodated as the twelve optical information recording media 100 in the disc cartridge 1. Each of the optical information recording media 100 has identification information as unique information. The identification information is recorded in, for example, an inner peripheral portion of the optical information recording medium 100 that is not accessible to a user in advance.

The identification information of Disc-0 is shown as an example of the optical information recording medium information in Table 1.

TABLE 1

| Optical information recording medium information (Disc-0) | | |
|---|---|---|
| AREA-0 | ... | |
| AREA-1 | Maker code<br>Disc type<br>Disc capacity<br>Number of disc layers | Reproduction-only area |
| AREA-2 | Disc unique number | Reproduction-only area |
| AREA-3 | ... | |

Common information that is first identification information is recorded in AREA-1 of a reproduction-only area. The common information refers to standard information (specification) which is common to the plurality of optical information recording media 100. The standard information includes, for example, a maker code, a disc type, a disc capacity, and the number of disc layers. In this case, the optical information recording media 100 accommodated in the case body 2 are assumed to be optical information recording media 100 having the same standard.

The maker code is a code unique to a manufacturer of the optical information recording medium 100. The disc type is a standard or a format of the optical information recording medium 100. The disc type includes, for example, a record-only type, a write-once type, or a rewriting type, and more specifically, includes BD-R (Blu-ray Disc Recordable) Ver.2.0 or BD-RE (Blu-ray Disc REwritable) Ver.3.0. The disc capacity is a recording capacity of the optical information recording medium 100. The disc space includes, for example, 100 GB or 128 GB. The number of disc layers is the number of recording layers of the optical information recording medium 100. The number of disc layers is, for example, three or four.

Second identification information is recorded in AREA-2 of the reproduction-only area. The second identification information includes, for example, a disc unique number. The disc unique number is a number unique to each of the optical information recording media 100.

The RFID tag 32 has the identification information that is unique information of the device. Identification information corresponding to Disc-0 to Disc-11 as twelve optical information recording media 100 accommodated in the disc cartridge 1 is recorded in the RFID tag 32.

An example of the RFID information is shown in Table 2.

TABLE 2

| RFID information | | |
|---|---|---|
| AREA-0 | ... | |
| AREA-1 | Twelve common information<br>Maker code<br>Disc type<br>Disc capacity<br>Number of disc layers | Read-locked |
| AREA-2 | Disc-0 unique number<br>Disc-1 unique number<br>.<br>.<br>.<br>Disc-10 unique number<br>Disc-11 unique number<br>Authentication code | Read/write locked |
| AREA-3 | ... | |

Reading of the first identification information is locked, and reading and writing of the second identification information are locked. When locking and unlocking are performed, a lock and unlock number is necessary as first key information. Further, the locking of the first identification information and the second identification information may be locking of access itself to the area or may be a form of locking of individual information.

The first identification information is recorded in AREA-1 of the read-locked area. The first identification information includes, for example, the maker code, the disc type, the disc capacity, and the number of disc layers as the common information of the twelve optical information recording media 100 accommodated in the disc cartridge 1.

The second identification information is recorded in AREA-2 of the read- and write-locked area. The second identification information includes, for example, disc unique numbers of the twelve optical information recording media 100, and an authentication code as authentication information.

Here, an example of a method of generating the RFID lock and unlock number will be described with reference to FIG. 6.

When the RFID lock and unlock number is generated, the RFID unique number is used as the unique information recorded in the RFID tag 32. Further, key A, for example, is prepared as a private key as second key information. Key A is recorded in, for example, the ROM, which is not illustrated, of the system controller 108.

Also, the RFID unique number and the key A read by the reading unit 50 are combined and operation A is performed. The RFID lock and unlock number is obtained as a result of operation A. It is preferable for operation A to be performed in the system controller 108. However, operation A may be performed in the external computer 200 to which the recording and reproducing apparatus 40 is attached.

In operation A, for example, HKDF (HMAC-based Extract-and-Expand Key Derivation Function) is available as a method of combining the private key with a device-specific value to generate a new key (a lock and unlock number).

As described above, the authentication code is recorded in AREA-2 as part of the second identification information.

Figure 7:
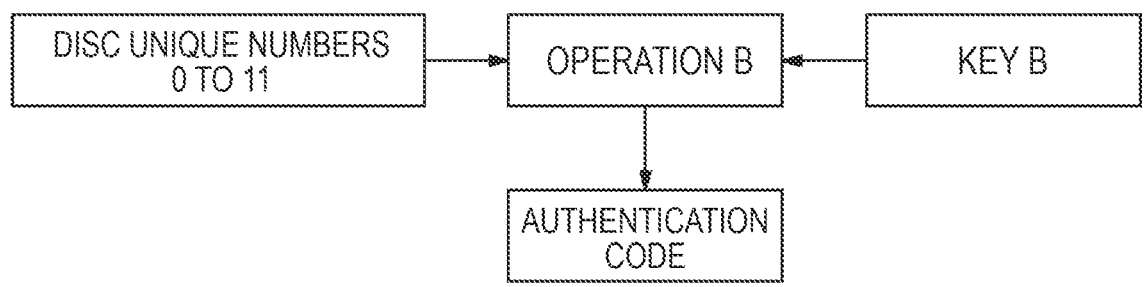
FIG. 7 is a schematic diagram illustrating an example of a method of generating an authentication code of a disc cartridge according to an embodiment of the present disclosure.

Here, an example of a method of generating the authentication code used when a comparison of the authentication code is performed at the time of recording or reproducing of the disc cartridge 1 will be described with reference to FIG. 7.

When the authentication code is generated, the disc unique number of each of the twelve media Disc-0 to Disc-11 is used. Further, key B, for example, is prepared as a private key as third key information. Key B is recorded in, for example, the ROM of the system controller 108, which is not illustrated.

Also, when the authentication code has already been recorded in AREA-2 and the comparison of the authentication code is performed in use (recording or reproduction) of the disc cartridge 1, the twelve disc unique numbers and key B are combined and operation B is performed. The authentication code is obtained as a result of operation B. It is preferable for operation B to be performed in the system controller 108. However, operation B may be performed in the external computer 200 to which the recording and reproducing apparatus 40 is attached. Further, when the recording of the authentication code in AREA-2 of the RFID tag 32 is performed, the disc unique number of each of the twelve media Disc-0 to Disc-11 is used.

In operation B, for example, HMAC (The Keyed-Hash Message Authentication Code) is available as a scheme of generating an authentication code using a private key.

[4. Configuration of the Recording and Reproducing Unit]

Figure 8:
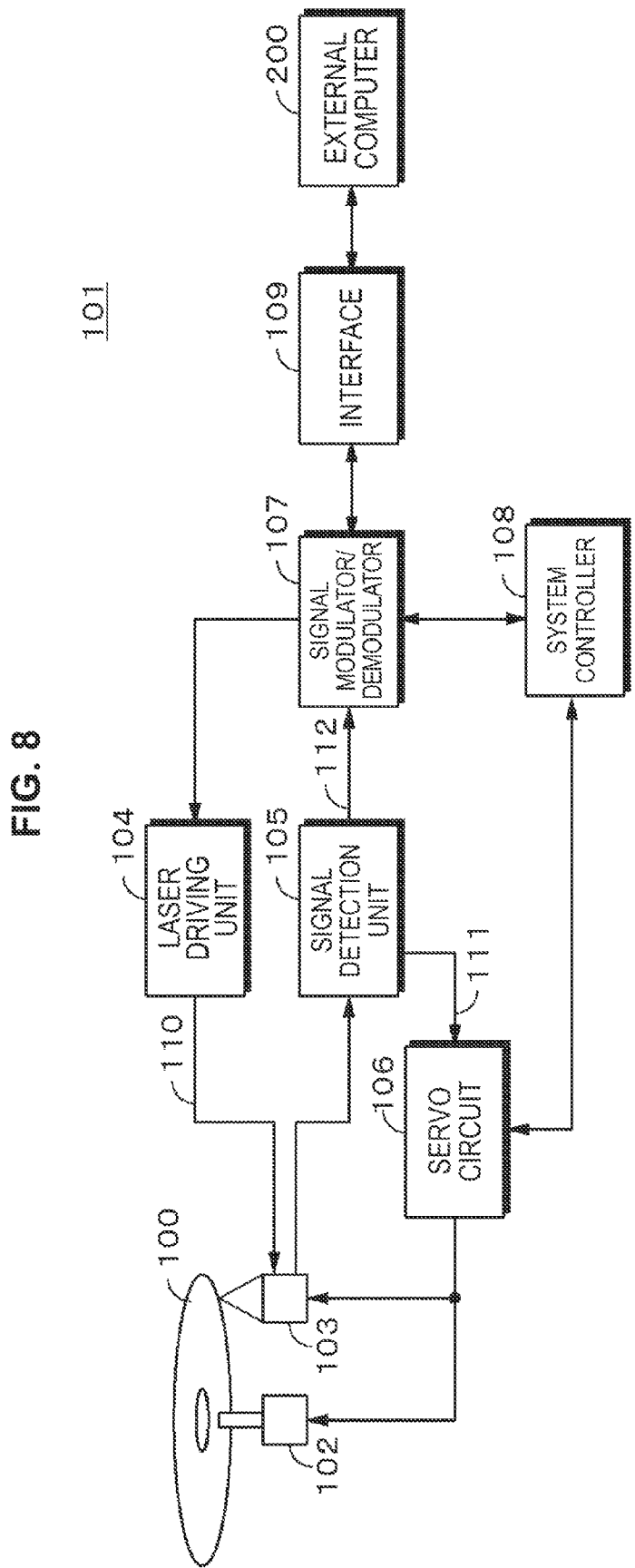
FIG. 8 is a block diagram illustrating an example of a configuration of a recording and reproducing unit of the recording and reproducing apparatus according to an embodiment of the present disclosure.

FIG. 8 illustrates an example of a configuration of the recording and reproducing unit 101 of the recording and reproducing apparatus 40. Information is recorded in the optical information recording medium 100, and information is reproduced from the optical information recording medium 100.

The recording and reproducing unit 101 includes a spindle motor 102, an optical head 103, a laser driving unit 104, a signal detection unit 105, a servo circuit 106, a signal modulator/demodulator 107, a system controller 108, and an interface 109.

The spindle motor 102 rotates the optical information recording medium 100. The optical information recording medium 100 is rotated, for example, at a constant linear velocity by the spindle motor 102. In other words, the optical information recording medium 100 is rotated in a CLV (Constant Linear Velocity) scheme. A zone CLV scheme may be used or PCAV (Partial Constant Angular Velocity) may be used as a rotation control scheme.

The optical head 103 is moved in a radial direction of the optical information recording medium 100 by a feed motor which is not illustrated. Also, the optical head 103 performs recording and reproducing of information in the optical information recording medium 100.

The laser driving unit 104 controls a laser light source of the optical head 103. A driving signal from the laser driving unit 104 is supplied to the optical head 103. The laser driving unit 104 performs control to change output power of the laser light source between a recording mode and a reproducing mode.

In the recording mode, a laser beam whose intensity has been modulated according to recorded information 110 is radiated from the optical head 103 to the optical information recording medium 100. The information is recorded in a predetermined position of the optical information recording medium 100 determined based on reproduced address information.

On the other hand, in the reproducing mode, a reading laser beam from the optical head 103 is radiated to a recording surface of the optical information recording medium 100, and a reflected light is detected by a photodetector in the optical head 103. The optical head 103 supplies a signal corresponding to the reflected light from the recording surface of the optical information recording medium 100 to the signal detection unit 105.

The signal detection unit 105 generates a servo error signal 111 such as a focus error signal or a tracking error signal, and an RF signal 112 that is a reproduction signal, based on an output from the optical head 103 which is a photodetector. A wobble signal may also be generated. Further, the signal detection unit 105 outputs the servo error signal 111 to the servo circuit 106. The signal detection unit 105 also outputs the RF signal 112 to the signal modulator/demodulator 107.

The servo circuit 106 drives and controls the spindle motor 102 and the feed motor, which is not illustrated, based on a command from the system controller 108. The servo error signal 111 is input from the signal detection unit 105 to the servo circuit 106. The servo circuit 106 generates a focus servo signal or a tracking servo signal such that the focus error signal or the tracking error signal is 0. The servo circuit 106 drives and controls an objective lens driving unit which is not illustrated, such as a 2-axis actuator which drives an objective lens based on the servo signal. Further, the servo circuit 106 detects a synchronization signal or the like based on the output from the signal detection unit 105, and controls the spindle motor 102, for example, in a CLV scheme. Thus, the rotation of the spindle motor 102 is controlled at a constant linear velocity and focusing and tracking of the optical head 103 are controlled by the servo circuit 106.

When recording of information in the optical information recording medium 100 is performed, the signal modulator/demodulator 107 performs a recording process on a digital signal input from the interface 109. For example, the signal modulator/demodulator 107 performs error correction coding and performs a modulation process such as a 1-7PP scheme. On the other hand, when reproduction of information recorded in the optical information recording medium 100 is performed, the signal modulator/demodulator 107 performs a demodulation process on the signal detected by the photodetector.

The system controller 108 controls each unit of the recording and reproducing unit 101. The system controller 108 controls the recording and reproducing unit 101 based on address information, TOC (Table Of Contents) or the like recorded in pre-mastered pits, grooves or the like which is in an innermost peripheral portion of the optical information recording medium 100 in response to a manipulation input from a user.

The recording and reproducing unit 101 is connected to the external computer 200 via the interface 109. The signal read from the optical information recording medium 100 is output to the external computer 200 via the interface 109, and the signal to be recorded in the optical information recording medium 100 is input from the external computer 200 via the interface 109.

In the recording and reproducing unit 101 configured as above, the optical information recording medium 100 is rotated by the spindle motor 102, and the feed motor, which is not illustrated, is driven and controlled according to the control signal from the servo circuit 106. The recording and reproducing unit 101 performs recording and reproducing of the information in the optical information recording medium 100 as the optical head 103 is moved to a position corresponding to a desired recording track of the optical information recording medium 100.

When the recording and reproducing unit 101 records the information in the optical information recording medium 100, a signal from the external computer 200 is input to the signal modulator/demodulator 107 via the interface 109. The signal modulator/demodulator 107 performs the error correction coding on digital information input from the interface 109, performs the modulation process, and then generates a recorded signal. The laser driving unit 104 controls the laser light source of the optical head 103 based on the recorded signal generated by the signal modulator/demodulator 107 such that the information is recorded in the optical information recording medium 100.

When the recording and reproducing unit 101 reproduces the information recorded in the optical information recording medium 100, the signal modulator/demodulator 107 performs the demodulation process on the signal detected by the photodetector. The recorded signal demodulated by the signal modulator/demodulator 107 is output to the external computer 200 via the interface 109. Accordingly, the external computer 200 can receive the information recorded in the optical information recording medium 100.

[5. Configuration of Identification Device]

Figure 9:
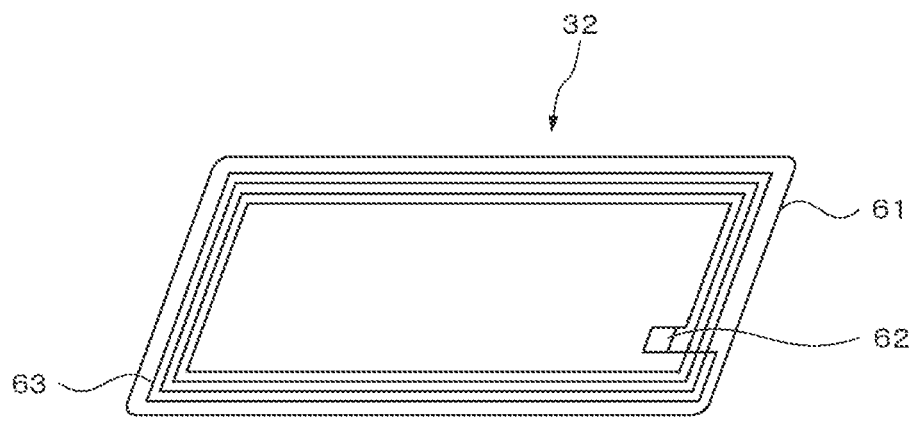
FIG. 9 is a schematic diagram illustrating an example of a configuration of an identification device attached to a disc cartridge according to an embodiment of the present disclosure.

FIG. 9 illustrates a configuration example of the RFID tag 32 as an example of the identification device attached to the disc cartridge 1. The RFID tag 32 has a function of reading or writing the identification information of the RFID tag 32 through the near field communication using an electromagnetic field or radio waves with the reading unit 50 of the recording and reproducing apparatus 40, as described above. A non-contact IC card or an RFID, for example, is used for the identification device. An example in which the RFID tag 32 has been attached will be described herein.

The RFID tag 32 includes a base 61, an IC chip 62, and an antenna coil 63. Both ends of the antenna coil 63 are connected to the IC chip 62. Further, an exterior material may be provided on both surfaces of the base 61.

A film shape, a sheet shape, or a substrate shape may be used as a shape of the base 61. However, the base is not particularly limited to such a material, and a material according to a characteristic necessary for the RFID tag 32 may be arbitrarily selected and used. For the material of the base 61, it is preferable to use a resin material having flexibility from the viewpoint of durability, convenience or the like. As such a resin material, for example, PEN (polyethylene naphthalate), PET (polyethylene terephthalate), polyimide (PI), or polyester may be used. However, the resin material is not particularly limited to these materials, and one of well-known resin materials may be arbitrarily selected and used based on the characteristic necessary for the RFID tag 32.

The antenna coil 63 is an electromagnetic induction coil in a loop coil shape wound a plurality of times on the base 61, and both ends thereof are connected to the IC chip 62. The antenna coil 63 receives an AC magnetic field generated from the reader/writer as the reading unit 50, induces an AC voltage, and supplies this AC voltage to the IC chip 62. As a method of forming the antenna coil 63, for example, a winding scheme, an embedding and winding scheme, an etching scheme, a plating scheme, or a screen printing scheme may be used.

The IC chip 62 is driven with power supplied from the antenna coil 63, and controls each unit of the RFID tag 32. For example, the IC chip 62 performs communication with the reader/writer via the antenna coil 63. Specifically, cross-authentication or information exchange with the reader/writer is performed.

Figure 10:
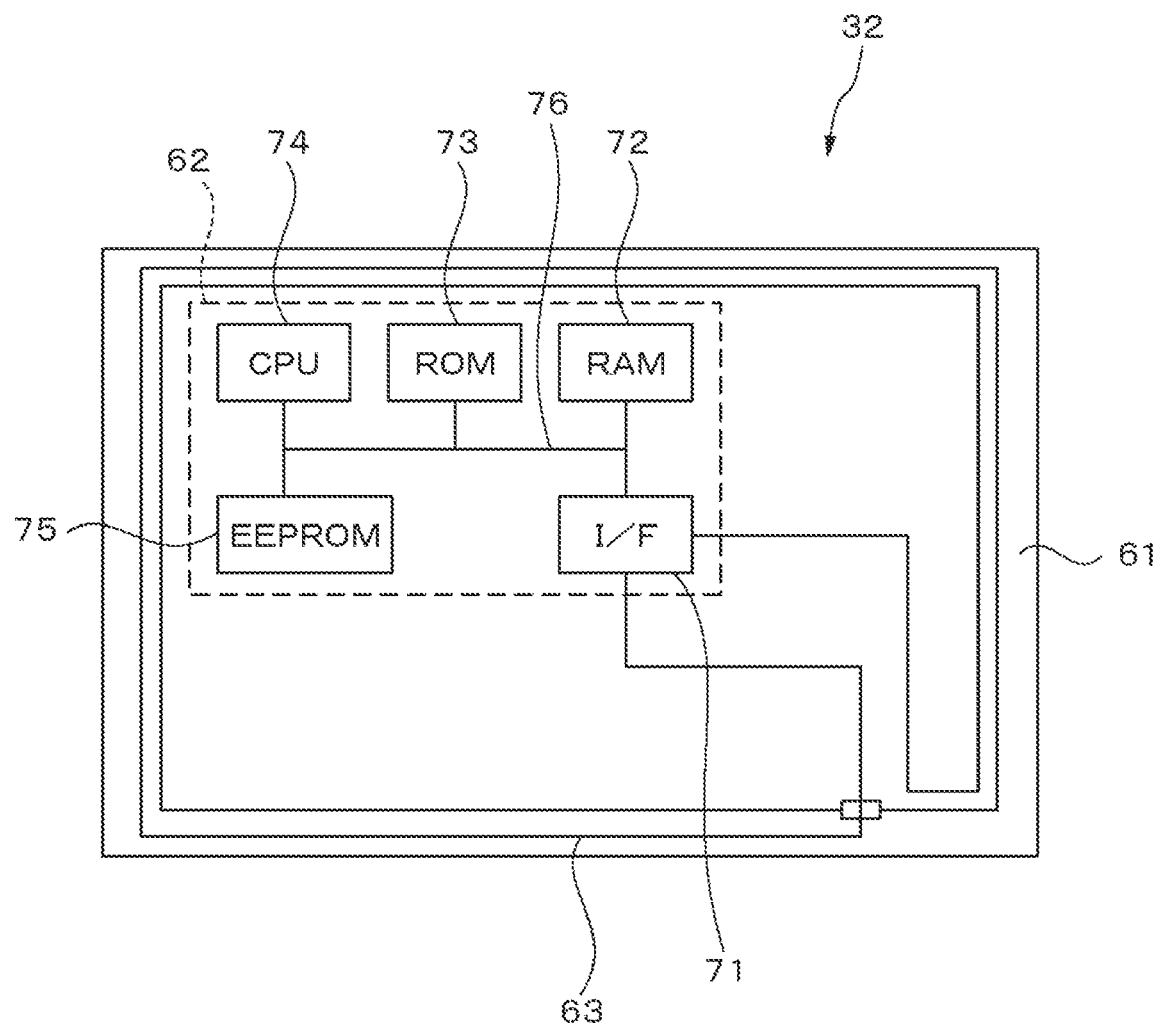
FIG. 10 is a block diagram illustrating a configuration example of a circuit of an identification device according to an embodiment of the present disclosure.

FIG. 10 illustrates a configuration example of a circuit of the RFID tag 32 as an example of the identification device. The IC chip 62 includes an interface 71, a RAM 72, a ROM 73, a CPU 74, and an EEPROM (Electrically Erasable and Programmable ROM) 75. The interface 71, the RAM 72, the ROM 73, the CPU 74, and the EEPROM 75 are connected to a bus 76.

The RAM 72 is used as a work memory of the CPU 74. Information input to the RFID tag 32 is stored in the EEPROM 75.

The CPU 74 operates according to an operation program stored in the ROM 73 in advance and performs, for example, control of a communication operation, which is performed with the reader/writer. The CPU 74 operates according to the operation program stored in the ROM 73 in advance.

As a communication scheme between the RFID tag 32 and the reading unit 50, various schemes as well as RFID or NFC (Near Field Communication) in which a wireless interface portion of non-contact IC card technology has been standardized may be used. For example, Bluetooth (registered trademark) may be used. For example, UWB (Ultra Wide Band) may be used. Further, for example, ZigBee may be used. Also, the communication scheme may correspond to a plurality of schemes of near field radio technology.

[6. Method (Operation) of Storing Identification Information]

Figure 11:
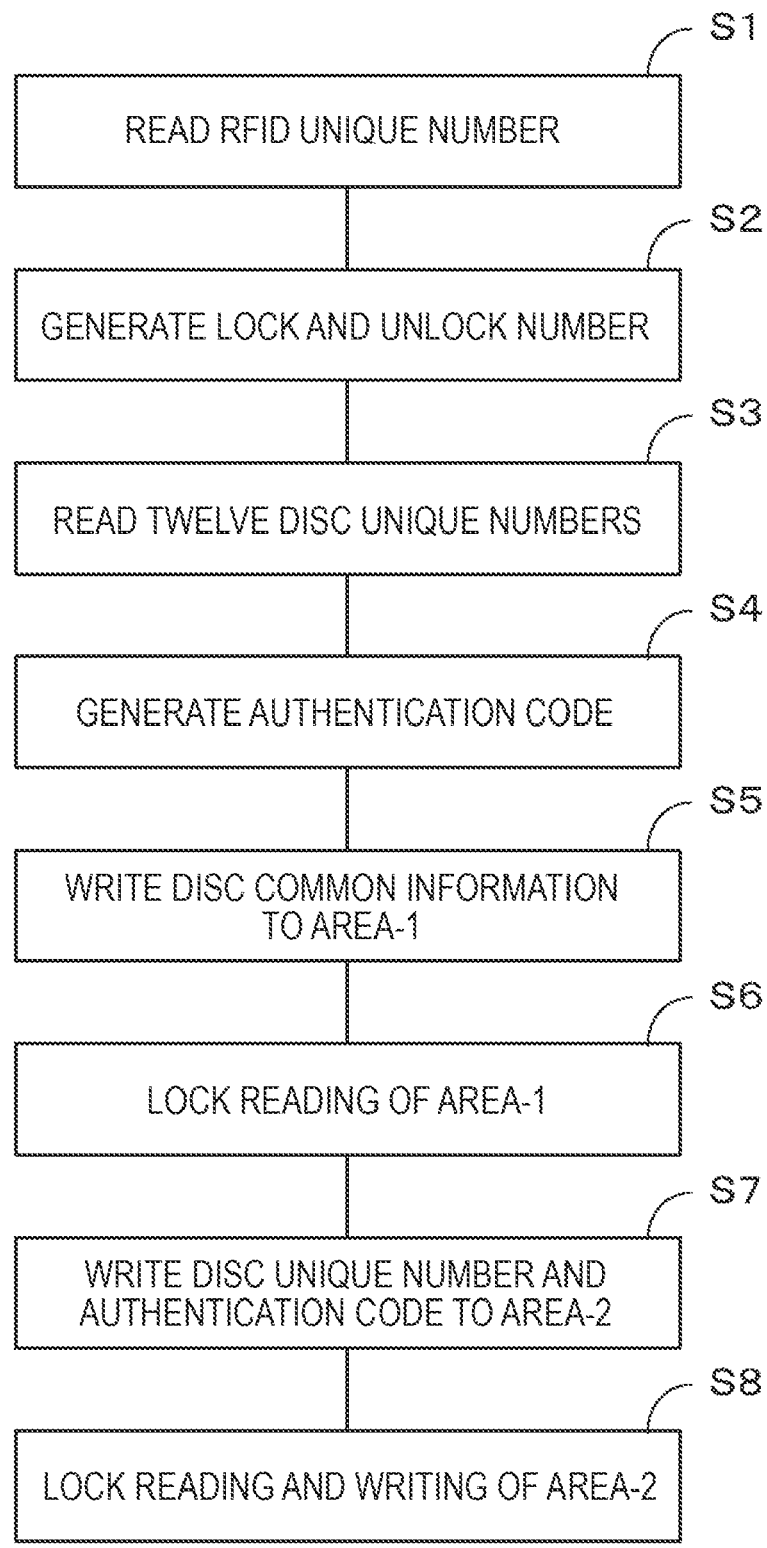
FIG. 11 is a flowchart illustrating an example of a method of storing identification information in the identification device of the disc cartridge according to an embodiment of the present disclosure.

Hereinafter, an example of a method of storing the identification information in the identification device of the disc cartridge 1 in which the optical information recording media 100 are accommodated will be described with reference to FIG. 11 and Table 2. Here, an example in which the RFID tag 32 is used as an example of the identification device will be described. For example, information of the disc cartridge 1 and the optical information recording media 100 accommodated in the disc cartridge 1 is recorded in the RFID tag 32 affixed to the disc cartridge 1, which is made by combining twelve optical information recording media 100, the first shell 3 and the second shell 4. Further, the following operation is performed by a command of the system controller 108. Further, the operation may be performed by a command from the external computer 200.

First, in step S1, an RFID unique number of the RFID tag 32 is read. The RFID unique number which is a number unique to each tag is recorded in the RFID tag 32 in advance. First, for example, the reading unit 50 transmits electromagnetic waves to the RFID tag 32. The RFID tag 32 receives the electromagnetic waves with the antenna, and drives the integrated circuit with power generated through electromagnetic induction. Further, the RFID unique number is transmitted from the RFID tag 32 to the reading unit 50. Subsequent reading or writing of the information from or to the RFID tag 32 is performed by the reading unit 50.

In step S2, an RFID lock and unlock number is then generated. The generation of the RFID lock and unlock number is performed using the method illustrated in FIG. 6.

In step S3, the disc unique number is then read for each of the twelve optical information recording media 100 of Disc-0 to Disc-11. The optical information recording media 100 from Disc-0 to Disc-11 of the disc cartridge 1 are sequentially loaded to the recording and reproducing unit (drive) 101 of the recording and reproducing apparatus 40, and the disc unique number is read for each of the twelve optical information recording media 100.

In step S4, an authentication code is then generated. The generation of the authentication code is performed using the method illustrated in FIG. 7.

In step S5, disc common information is then written to AREA-1 of the RFID tag 32. The disc common information includes, for example, the maker code, the disc type, the disc capacity, and the number of disc layers, as shown in Table 2.

In step S6, reading of AREA-1 is then locked. The lock and unlock number generated in step S2 is used to lock reading of the information recorded in the area of AREA-1.

In step S7, the disc unique number and the authentication code are then written to AREA-2 of the RFID tag 32. The disc unique number is written for each of the twelve discs.

In step S8, reading and writing of AREA-2 are then locked. The lock and unlock number generated in step S2 is also used to lock reading of the information recorded in the area of AREA-2.

Using the above-described method, it is possible to manufacture the RFID tag 32 attached to the disc cartridge 1, and the RFID tag 32 in which the unique number of each of the twelve optical information recording media 100 accommodated in the disc cartridge 1 has been recorded and the recorded information has been locked.

[7. Method of Operating Recording and Reproducing Apparatus]

Figure 12:
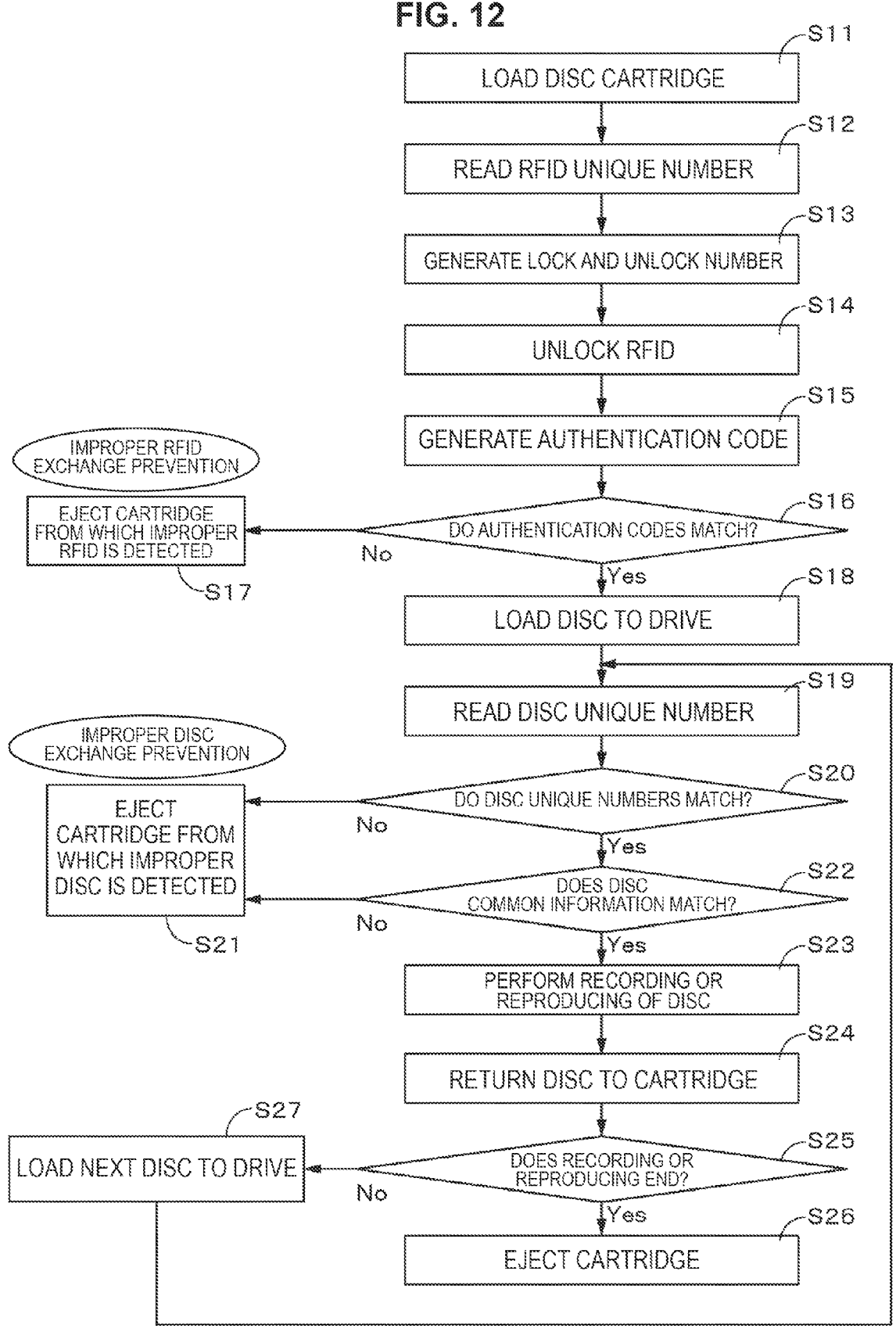
FIG. 12 is a flowchart illustrating an example of an operation of the recording and reproducing apparatus according to an embodiment of the present disclosure.

Hereinafter, an example of an operation of the recording and reproducing apparatus 40 of the disc cartridge 1 will be described with reference to FIG. 12. Further, the following operation is performed by a command of the system controller 108. Further, the operation may be performed by a command from the external computer 200.

First, in step S11, the disc cartridge 1 is loaded. The disc cartridge 1 is inserted from the cartridge insertion/ejection opening of the panel 43 of the recording and reproducing apparatus 40, and the RFID tag 32 is located near the reading unit 50.

In step S12, the RFID unique number, which is a number unique to each tag that has been recorded in the RFID tag 32 in advance, is then read. More specifically, first, the reading unit 50 transmits electromagnetic waves to the RFID tag 32. The RFID tag 32 receives the electromagnetic waves with the antenna, and drives the integrated circuit with power generated through electromagnetic induction. Also, the RFID unique number is transmitted from the RFID tag 32 to the reading unit 50.

In step S13, the lock and unlock number is then generated. The generation of the lock and unlock number is performed using the method illustrated in FIG. 6.

In step S14, the RFID is then unlocked. The lock and unlock number generated in operation A is sent from the reading unit 50 to the RFID tag 32. Also, the area of AREA-1 of the RFID tag 32 of which reading has been locked, and the area of AREA-2 of the RFID tag 32 of which reading and writing have been locked are unlocked. Accordingly, the reading unit 50 can perform reading of AREA-1 and AREA-2 and writing to AREA-2.

In step S15, the authentication code is then generated. The disc unique number of each of the twelve discs accommodated in the disc cartridge 1 is recorded in AREA-2 in which reading can be performed. The reading unit 50 reads the disc unique numbers. Also, the generation of the authentication code is performed using the method illustrated in FIG. 7.

In step S16, a determination is then made as to whether the authentication codes match. The authentication code has been recorded in AREA-2 in advance. First, the reading unit 50 reads the authentication code. Also, the system controller 108 compares the read authentication code with the authentication code obtained through operation B. Also, the system controller 108 determines that an improper authentication code has been detected when the two authentication codes do not match. When the improper authentication code has been detected, the process proceeds to step S17. On the other hand, when the improper authentication code is not detected, the process proceeds to step S18.

When the improper authentication code has been detected, the RFID is deemed to have been changed improper and the disc cartridge 1 from which the improper RFID is detected is ejected in step S17. Accordingly, improper exchange of the RFID tag 32 is prevented. On the other hand, when the improper authentication code is not detected, one (e.g., Disc-0 ) of the plurality of optical information recording media 100 is loaded to the recording and reproducing unit (drive) 101 in step S18.

In step S19, the disc unique number, which is a number unique to each disc that has been recorded in the optical information recording medium 100 in advance, is then read. The recording and reproducing unit 101 reads, for example, the disc unique number of the first Disc-0.

In step S20, the disc unique numbers are then compared to determine whether the disc unique numbers match. The system controller 108 compares the unique number of Disc-0 read by the recording and reproducing unit 101 with the unique number of Disc-0 of AREA-2 read in step S15. Also, when the two disc unique numbers do not match, the system controller 108 determines that impropriety is detected. When the disc unique numbers do not match, the process proceeds to step S21. On the other hand, when the disc unique numbers match, in other words, when propriety is determined through combination, the process proceeds to step S22.

When the disc unique numbers do not match, the optical information recording medium 100 (Disc-0) is deemed to have been exchanged improperly and the disc cartridge 1 of which the improper disc is detected is ejected in step S21.

Accordingly, the improper exchange of the optical information recording medium 100 is prevented.

On the other hand, when the disc unique numbers match, disc common information is compared to determine whether the disc unique numbers match in step S22. The disc common information which is common to the twelve optical information recording media 100 is recorded in AREA-1. First, the reading unit 50 reads the disc common information. Then, the recording and reproducing unit 101 reads the disc common information, for example, in the first Disc-0. The system controller 108 compares the disc common information read by the recording and reproducing unit 101 with the disc common information of AREA-1. Also, when the disc common information does not match, the system controller 108 determines that impropriety is detected. When the disc common information does not match, the process proceeds to step S21. On the other hand, when disc common information matches, the process proceeds to step S23.

Further, the reading of the disc common information recorded in AREA-1 may be performed in step S15. Also, the reading of the disc common information from the optical information recording medium 100 may be performed in step S19.

When the disc common information does not match, the optical information recording medium 100 (Disc-0) is deemed to have been exchanged improperly and the cartridge of which the improper disc is detected is ejected in step S21. Accordingly, the improper exchange of the optical information recording medium 100 is also prevented herein.

On the other hand, when the disc common information matches, recording or reproducing of the information in the optical information recording medium 100 (Disc-0) is performed in step S23.

When the recording or reproducing of the information in the optical information recording medium 100 (Disc-0) ends, the optical information recording medium 100 (Disc-0) returns to the disc cartridge 1 in step S24.

In step S25, a determination is then made as to whether the recording or reproducing of the information in the disc cartridge 1 ends. When the recording or reproducing of the information in the disc cartridge 1 ends, the process proceeds to step S26. On the other hand, when the recording or reproducing of the information in the disc cartridge 1 does not end, the process proceeds to step S27.

When the recording or reproducing of the information in the disc cartridge 1 ends, the disc cartridge 1 is ejected in step S26.

On the other hand, when the recording or reproducing of the information in the disc cartridge 1 continues, a next optical information recording medium 100 (e.g., Disc-1) is loaded to the recording and reproducing unit (drive) 101 in step S27, and the process returns to step S19.

Further, the area in which the disc unique number or the disc common information of the optical information recording medium 100 has been recorded may be damaged. When it is difficult to perform reading in these steps S19 and S22, use of the optical information recording medium 100 (e.g., Disc-0) may stop and Disc-0 may be exchanged with the next optical information recording medium 100 (Disc-1).

Further, in the same case, use of all the optical information recording media 100 accommodated in the disc cartridge 1 may stop.

With the above-described method, it is possible to detect the disc cartridge 1 with the improper RFID tag 32 or the improper optical information recording medium 100 and to perform recording or reproducing of the information in the disc cartridge 1 with normality.

[8. Configuration of External Computer to which Recording and Reproducing Apparatus is Attached]

Figure 13:
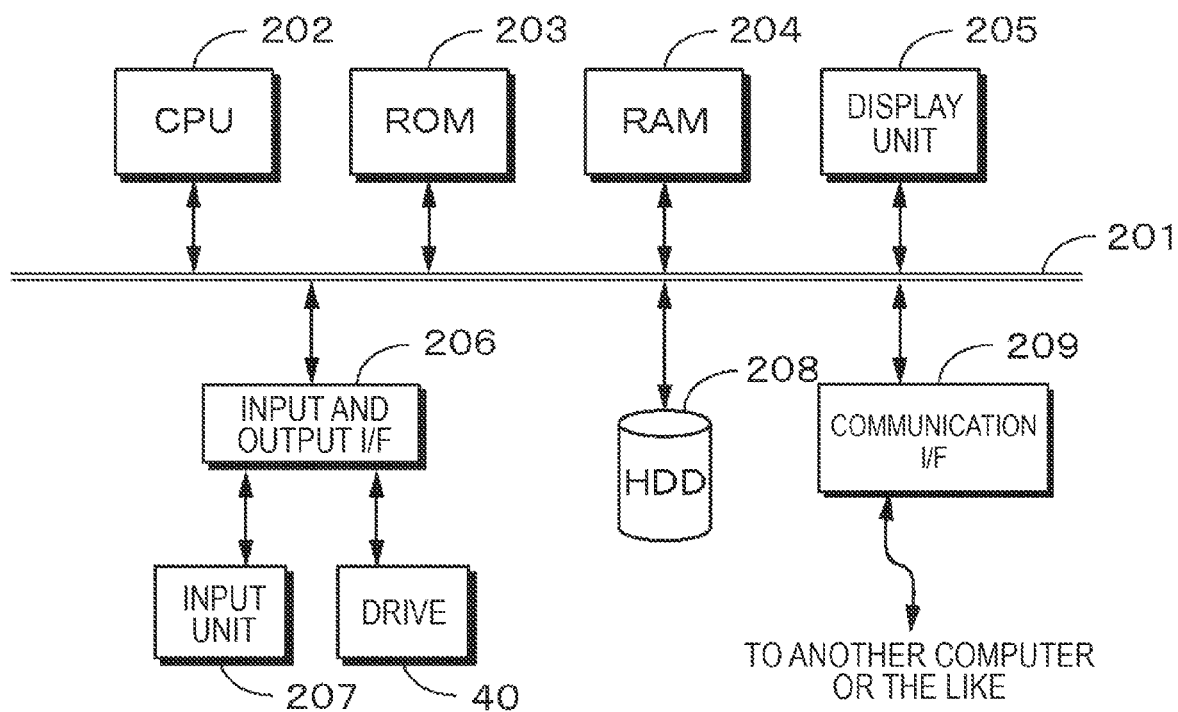
FIG. 13 is a block diagram illustrating an example of a configuration of an external computer to which the recording and reproducing apparatus is attached according to an embodiment of the present disclosure.

FIG. 13 illustrates an example of a configuration of the external computer 200 to which the recording and reproducing apparatus 40 described above is attached. The external computer 200 is, for example, a device having a configuration according to a general personal computer or computer device.

In the external computer 200, a CPU 202, a ROM 203 and a RAM 204 are connected to a bus 201. In the ROM 203, an initial program for starting up the external computer 200, for example, is stored in advance. The RAM 204 is used as a work memory of the CPU 202.

A display unit 205, an input and output interface (an input and output I/F) 206, a hard disk drive 208, and a communication interface (communication I/F) 209 are also connected to the bus 201. The display unit 205 is built in the external computer 200 or connected to the external computer 200 and used, and performs display according to a display control signal generated by the CPU 202. The input unit 207 for receiving an input from a user, such as a keyboard, a mouse or a manipulation panel with a predetermined manipulation device, is connected to the input and output I/F 206.

Also, the recording and reproducing apparatus 40 is connected to the input and output I/F 206 as a drive device capable of recording and reproducing in the optical information recording medium 100.

A program for controlling an operation of the external computer 200 and executing each method described above is stored in the hard disk drive 208. For example, at the time of start-up of the external computer 200, the CPU 202 reads the program recorded in the hard disk drive 208 according to the initial program read from the ROM 203, develops the program on the RAM 204, and controls the operation of the external computer 200.

The communication I/F 209 is connected, for example, to another computer via a network such as a LAN (Local Area Network). From the other computer, recording and reproducing of the optical information recording medium 100 in the recording and reproducing apparatus 40 may be performed via the communication I/F 209.

<Variant>

In the second shell 4, a unique number is described for each disc cartridge 1. In a variant, a unique number of the second shell 4 is used in place of the disc unique number and the disc common information. A reading unit, which is not illustrated, for reading the unique number of the second shell 4 is prepared.

In this case, reading of the unique number of the second shell 4 is performed in place of reading of the disc unique numbers of the twelve discs in step S3 of [6. Method of storing identification information]. Further, in step S7, the unique number of the second shell 4 together with the authentication code to AREA-2 is written in place of the disc unique number. Accordingly, the unique number for each disc cartridge 1 described in the second shell 4 is registered in the RFID.

Also, reading of the unique number of the second shell 4 may be performed in place of reading of the disc unique number in steps S19, S20 and S21 of [7. Method of operating recording and reproducing apparatus].

In other words, the unique number of the second shell 4 is read in step S19.

In step S20, the unique numbers of the second shell 4 are then compared to determine whether the unique numbers match. The system controller 108 compares the unique number of the second shell 4 read by the reading unit, which is not illustrated, with the unique number of the second shell 4 of AREA-2 read in step S15. Also, when the two unique numbers of the second shell 4 do not match, the system controller 108 determines that impropriety is detected. When the unique numbers of the second shell 4 do not match, the process proceeds to step S21. On the other hand, when the unique numbers match, the process proceeds to step S23.

When the unique numbers of the second shell 4 do not match, the second shell 4 is deemed to have been exchanged improperly, and the disc cartridge 1 of which the improper shell is detected is ejected in step S21.

On the other hand, when the unique numbers of the second shell 4 match, recording or reproducing of the information in the optical information recording medium 100 (e.g., Disc-0) is performed in step S23.

By doing so, it is possible to determine normality of a combination of the first shell 3 and the second shell 4.

Further, the unique number described in the second shell 4 may have a form used for the authentication code. In this case, reading of the unique number of the second shell 4 is performed with the reading of the twelve disc numbers in step S3 of [6. Method of storing identification information]. In step S4, generation of the authentication code is then performed. Further, in step S7, the unique number of the second shell 4 is written to AREA-2 together with the disc unique number and the authentication code. Also, in step S15 of [7. Method of operating recording and reproducing apparatus], the unique number of the second shell 4 may be used at the time of generating the authentication code.

In this disclosure, media are accommodated in one of the shells. To this end, in the variant described above, it is possible to confirm validity of a combination of the first shell (e.g., an upper shell) and the second shell (e.g., a lower shell). Therefore, it is possible to detect replacement of the first shell or the second shell. Accordingly, it is possible to indirectly detect a combination of the shell and the medium.

[Effects of Embodiments]

In the embodiment of this disclosure, the RFID is attached to the upper shell, and the unique number of the disc accommodated in the lower shell is registered in the RFID. In this disclosure, with this configuration, an effect that the combination of the disc cartridge and the disc and the combination of the upper and lower shells of the disc cartridge can be recognized is achieved. Similarly, in this disclosure, with the configuration in which the unique number for each disc cartridge described in the lower shell is registered in the RFID, an effect that the combination of the upper and lower shells of the disc cartridge can be recognized is achieved. Therefore, according to this disclosure, it is possible to provide a cartridge and a changer in which the normality of the optical information recording medium or the cartridge accommodating the optical information recording medium can be confirmed.

Additionally, the present technology may also be configured as below.

(1) A cartridge including:

a plurality of optical information recording media having unique information recorded thereon;

an accommodation body configured to accommodate the plurality of optical information recording media; and an identification device configured to store the unique information of the plurality of optical information recording media and supply the unique information to a changer in a non-contact manner, the identification device being provided in the accommodation body.

(2) The cartridge according to (1), wherein the unique information includes a unique number of each medium.

(3) The cartridge according to any one of (1) to (2), wherein the identification device further stores common information which is common to the plurality of optical information recording media.

(4) The cartridge according to any one of (1) to (3), wherein the identification device further stores unique information of the identification device.

(5) The cartridge according to any one of (1) to (4), wherein the unique information stored in the identification device is locked by first key information generated using the unique information of the identification device.

(6) The cartridge according to (5), wherein the first key information is generated by the unique information of the identification device and second key information given to the changer.

(7) The cartridge according to any one of (1) to (6), wherein the identification device further stores authentication information of the identification device.

(8) The cartridge according to (7), wherein the authentication information is information generated using the unique information of the plurality of optical information recording media.

(9) The cartridge according to (8), wherein the authentication information is generated by the unique information of the plurality of optical information recording media and third key information given to the changer.

(10) The cartridge according to any one of (1) to (9), wherein the accommodation body includes a first shell and a second shell, and wherein the plurality of optical information recording media are accommodated in one of the first shell and the second shell, and the identification device is provided in the other.

(11) A changer including:

a cartridge accommodation unit configured to accommodate a cartridge including a plurality of optical information recording media having unique information recorded thereon, an accommodation body which accommodates the plurality of optical information recording media, and an identification device which stores the unique information of the plurality of optical information recording media and supplies the unique information to the changer in a non-contact manner, the identification device being provided in the accommodation body;

an optical unit configured to perform recording or reproducing of the optical information recording medium;

a reading unit configured to read information of the identification device of the cartridge in a non-contact manner; and a control unit configured to compare the unique information read from the optical information recording medium with the unique information read from the identification device.

(12) The changer according to (11), wherein the optical unit performs recording or reproducing of data in the optical information recording medium determined to be proper through the comparison, and performs comparison of unique information of a different optical information recording medium from the optical information recording medium after completing the recording or reproducing of the optical information recording medium.

(13) The changer according to any one of (11) to (12), wherein the unique information stored in the identification device is locked by first key information, and wherein the control unit generates the first key information using the unique information of the identification device, and unlocks the unique information stored in the identification device using the first key information.

(14) The changer according to (13), wherein the first key information is generated by the unique information of the identification device and second key information given to the changer.

(15) The changer according to any one of (13) to (14), wherein the identification device further stores authentication information, and wherein the control unit generates the authentication information using the unique information of the plurality of optical information recording media read from the identification device, and compares the generated authentication information with the authentication information read from the identification device.

(16) The changer according to any one of (13) to (15), wherein common information which is common to all the optical information recording media is further stored in the plurality of optical information recording media, wherein the identification device further stores the common information which is common to the plurality of optical information recording media, and wherein the control unit compares the common information read from the optical information recording medium with common information read from the identification device.

The embodiments of the present disclosure have been described specifically. However, embodiments of the present disclosure are not limited to the above-described embodiment, but may be modified in various ways based on the technical sprit and essence of the present disclosure. For example, the configurations, the methods, the processes, the shapes, the materials, the numerical values, and the like mentioned in the above-described embodiments are merely examples. Different configurations, methods, processes, shapes, materials, numerical values, and the like may be used, as necessary.

Further, configuration, methods, processes, shapes, materials, numerical values and the like in the above-described embodiments may be combined insofar as they are not departing from the spirit of the present disclosure. For example, a management method that is a combination of the method of operating recording and reproducing apparatus of the embodiment and the variant described above may be used.

What is claimed is:

1. A cartridge comprising:
a plurality of optical information recording media having unique information recorded thereon;
an accommodation body configured to accommodate the plurality of optical information recording media; and
an identification device configured to store the unique information of the plurality of optical information recording media and supply the unique information to a changer in a non-contact manner, the identification device being provided in the accommodation body,
wherein the accommodation body includes a first shell and a second shell, and
wherein the plurality of optical information recording media are accommodated in one of the first shell and the second shell, and the identification device is provided in other of the first shell and the second shell.

2. The cartridge according to claim 1, wherein the unique information includes a unique number of each of the plurality of optical information recording media.

3. The cartridge according to claim 1, wherein the identification device further stores common information which is common to the plurality of optical information recording media.

4. The cartridge according to claim 1, wherein the identification device further stores unique information of the identification device.

5. The cartridge according to claim 1, wherein the unique information stored in the identification device is locked by first key information generated using the unique information of the identification device.

6. The cartridge according to claim 5, wherein the first key information is generated by the unique information of the identification device and second key information given to the changer.

7. The cartridge according to claim 1, wherein the identification device further stores authentication information of the identification device.

8. The cartridge according to claim 7, wherein the authentication information is information generated using the unique information of the plurality of optical information recording media.

9. The cartridge according to claim 8, wherein the authentication information is generated by the unique information of the plurality of optical information recording media and third key information given to the changer.

10. A changer comprising:
a cartridge accommodation unit configured to accommodate a cartridge including a plurality of optical information recording media having unique information recorded thereon, an accommodation body which accommodates the plurality of optical information recording media, and an identification device which stores the unique information of the plurality of optical information recording media and supplies the unique information to the changer in a non-contact manner, the identification device being provided in the accommodation body;
an optical unit configured to perform recording or reproducing of an optical information recording medium from the plurality of optical information recording media;
a reading unit configured to read information of the identification device of the cartridge in a non-contact manner; and
a control unit configured to compare the unique information read from the optical information recording medium with the unique information read from the identification device,
wherein the optical unit performs recording or reproducing of data in the optical information recording medium based on the comparison when the unique information read from the optical information recording medium matches with the unique information read from the identification device, and performs comparison of unique information of another optical information recording medium after completing the recording or reproducing of the optical information recording medium.

11. The changer according to claim 10,
wherein the unique information stored in the identification device is locked by first key information, and
wherein the control unit generates the first key information using the unique information of the identification device, and unlocks the unique information stored in the identification device using the first key information.

12. The changer according to claim 11, wherein the first key information is generated by the unique information of the identification device and second key information given to the changer.

13. The changer according to claim 11,
wherein the identification device further stores authentication information, and
wherein the control unit generates the authentication information using the unique information of the plurality of optical information recording media read from the identification device, and compares the generated authentication information with the authentication information read from the identification device.

14. The changer according to claim 11,
wherein common information which is common to the plurality of optical information recording media is further stored in the plurality of optical information recording media,
wherein the identification device further stores the common information which is common to the plurality of optical information recording media, and
wherein the control unit compares the common information read from the optical information recording medium with common information read from the identification device.

* * * * *